US008107511B2

(12) United States Patent
Budampati et al.

(10) Patent No.: US 8,107,511 B2
(45) Date of Patent: Jan. 31, 2012

(54) APPARATUS AND METHOD FOR INTELLIGENT FREQUENCY-HOPPING DISCOVERY AND SYNCHRONIZATION

(75) Inventors: Ramakrishna S. Budampati, Maple Grove, MN (US); Soumitri N. Kolavennu, Minneapolis, MN (US); Patrick S. Gonia, Maplewood, MN (US)

(73) Assignee: Honeywell International Inc., Morristown, NJ (US)

( * ) Notice: Subject to any disclaimer, the term of this patent is extended or adjusted under 35 U.S.C. 154(b) by 1274 days.

(21) Appl. No.: 11/796,967

(22) Filed: Apr. 30, 2007

(65) Prior Publication Data

US 2008/0267259 A1 Oct. 30, 2008

(51) Int. Cl.
*H04B 1/69* (2011.01)
(52) U.S. Cl. ........ 375/134; 375/133; 375/260; 375/132; 375/224; 370/324; 370/280; 370/469; 370/466; 455/517; 455/519
(58) Field of Classification Search ............... 375/134, 375/133, 356, 315, 136, 260, 135, 224; 370/315, 370/350, 342, 335, 324, 321, 280, 469, 466; 455/517, 519
See application file for complete search history.

(56) References Cited

U.S. PATENT DOCUMENTS

| 5,875,179 | A * | 2/1999 | Tikalsky | 370/315 |
|---|---|---|---|---|
| 6,272,353 | B1 * | 8/2001 | Dicker et al. | 455/517 |
| 6,292,508 | B1 * | 9/2001 | Hong et al. | 375/134 |
| 7,474,992 | B2 | 1/2009 | Ariyur | |
| 7,580,037 | B1 * | 8/2009 | Iotov | 345/440 |
| 2005/0201349 | A1 | 9/2005 | Budampati | |
| 2005/0281215 | A1 | 12/2005 | Budampati et al. | |
| 2006/0002368 | A1 | 1/2006 | Budampati et al. | |
| 2006/0171344 | A1 | 8/2006 | Subramanian et al. | |
| 2006/0171346 | A1 | 8/2006 | Kolavennu et al. | |
| 2006/0215779 | A1 * | 9/2006 | Shiina | 375/260 |
| 2006/0227729 | A1 | 10/2006 | Budampati et al. | |
| 2006/0274644 | A1 | 12/2006 | Budampati et al. | |
| 2006/0274671 | A1 | 12/2006 | Budampati et al. | |
| 2006/0285579 | A1 | 12/2006 | Rhee et al. | |

(Continued)

FOREIGN PATENT DOCUMENTS

WO WO 02/37757 A2 5/2002

OTHER PUBLICATIONS

Thomas L. Phinney, "Apparatus and Method for Acknowledging Successful Transmissions in a Wireless Communication System," U.S. Appl. No. 11/799,171, filed May 1, 2007.

(Continued)

*Primary Examiner* — Eva Puente

(57) ABSTRACT

A process control system or other system includes multiple nodes that communicate using frequency-hopping patterns. Each node may operate using its own frequency-hopping pattern. Each node may also broadcast information identifying its frequency-hopping pattern to other nodes, such as any neighboring nodes. Each node may further receive information identifying the frequency-hopping patterns of any neighboring nodes. The nodes may then operate in a non-synchronized manner and use the frequency-hopping patterns of neighboring nodes to communicate. For example, each node may use the identified frequency-hopping pattern of a neighboring node to synchronize with and communicate data to the neighboring node. In this way, the nodes need not maintain synchronization at all times during operation. Also, different nodes may use different frequency channels at the same time, helping to increase the bandwidth available for wireless communications.

21 Claims, 7 Drawing Sheets

U.S. PATENT DOCUMENTS

| | | | |
|---|---|---|---|
| 2006/0287001 | A1 | 12/2006 | Budampati et al. |
| 2007/0030816 | A1 | 2/2007 | Kolavennu |
| 2007/0030832 | A1 | 2/2007 | Gonia et al. |
| 2007/0076638 | A1 | 4/2007 | Kore et al. |
| 2007/0077941 | A1 | 4/2007 | Gonia et al. |
| 2007/0087763 | A1 | 4/2007 | Budampati et al. |
| 2007/0091824 | A1 | 4/2007 | Budampati et al. |
| 2007/0091825 | A1 | 4/2007 | Budampati et al. |
| 2007/0155423 | A1 | 7/2007 | Carmody et al. |
| 2008/0247336 | A1* | 10/2008 | Sugitani .................. 370/280 |
| 2009/0016260 | A1* | 1/2009 | Thesling .................. 370/321 |
| 2009/0067387 | A1* | 3/2009 | Pan ............................. 370/335 |
| 2009/0185600 | A1* | 7/2009 | Hethuin et al. ............ 375/133 |

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

"Specification of the Bluetooth System, Master Table of Contents & Compliance Requirements", see esp. section 8.6.6 Scatternet on p. 177 of 814, Bluetooth, Nov. 4, 2004, 51 pages.

Communication pursuant to Article 94(3) EPC dated Feb. 25, 2011 in connection with European Patent Application No. 08 747 130.6.

* cited by examiner

APPARATUS AND METHOD FOR INTELLIGENT FREQUENCY-HOPPING DISCOVERY AND SYNCHRONIZATION

TECHNICAL FIELD

This disclosure relates generally to wireless communication systems and more specifically to an apparatus and method for intelligent frequency-hopping discovery and synchronization.

BACKGROUND

Wireless communication systems routinely employ frequency-hopping spread-spectrum techniques. These techniques typically involve transmitting wireless signals using multiple frequency channels. In these techniques, both transmitters and receivers quickly switch among the multiple frequency channels, where the switching occurs in a pseudo-random order. Frequency-hopping spread-spectrum techniques are often useful since they help to reduce the effects of electromagnetic interference and other interference and noise. As a particular example, these techniques are often useful in industrial control systems where large amounts of interference and noise are generated by industrial processes.

Frequency-hopping spread-spectrum techniques often require synchronization between the transmitters and the receivers. Typically, this involves synchronizing all transmitters and all receivers to the same frequency-hopping pattern and offset or phase. A frequency-hopping pattern represents a sequence of frequency channels, which identifies the order of the channels used during communications. The offset or phase identifies a current location in the frequency-hopping pattern used by the transmitters. When synchronized to the transmitters' frequency-hopping pattern and offset or phase, the receivers know the channel frequency that the transmitters use at any given time.

SUMMARY

This disclosure provides an apparatus and method for intelligent frequency-hopping discovery and synchronization.

In a first embodiment, an apparatus includes a transceiver operable to communicate with a node in a wireless network. The apparatus also includes a memory operable to store information associated with a frequency-hopping pattern of the node. In addition, the apparatus includes a controller operable to synchronize the transceiver with the node using the frequency-hopping pattern of the node.

In a second embodiment, a system includes a plurality of nodes forming a wireless network. Each node is operable to broadcast information identifying a frequency-hopping pattern of that node and to receive information identifying a frequency-hopping pattern of at least one other node. Each node is also operable to communicate with the at least one other node using the frequency-hopping pattern of the at least one other node.

In a third embodiment, a method includes scanning a plurality of frequency channels for messages from a gateway at a first node in a wireless network. The method also includes synchronizing the first node with a frequency-hopping pattern of the gateway using the messages. The method further includes transmitting information identifying a frequency-hopping pattern of the first node to a second node in the wireless network. The method also includes receiving information identifying a frequency-hopping pattern of the second node at the first node. In addition, the method includes operating the first node using the frequency-hopping pattern of the first node and synchronizing the first node with the second node for wireless communication using the frequency-hopping pattern of the second node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
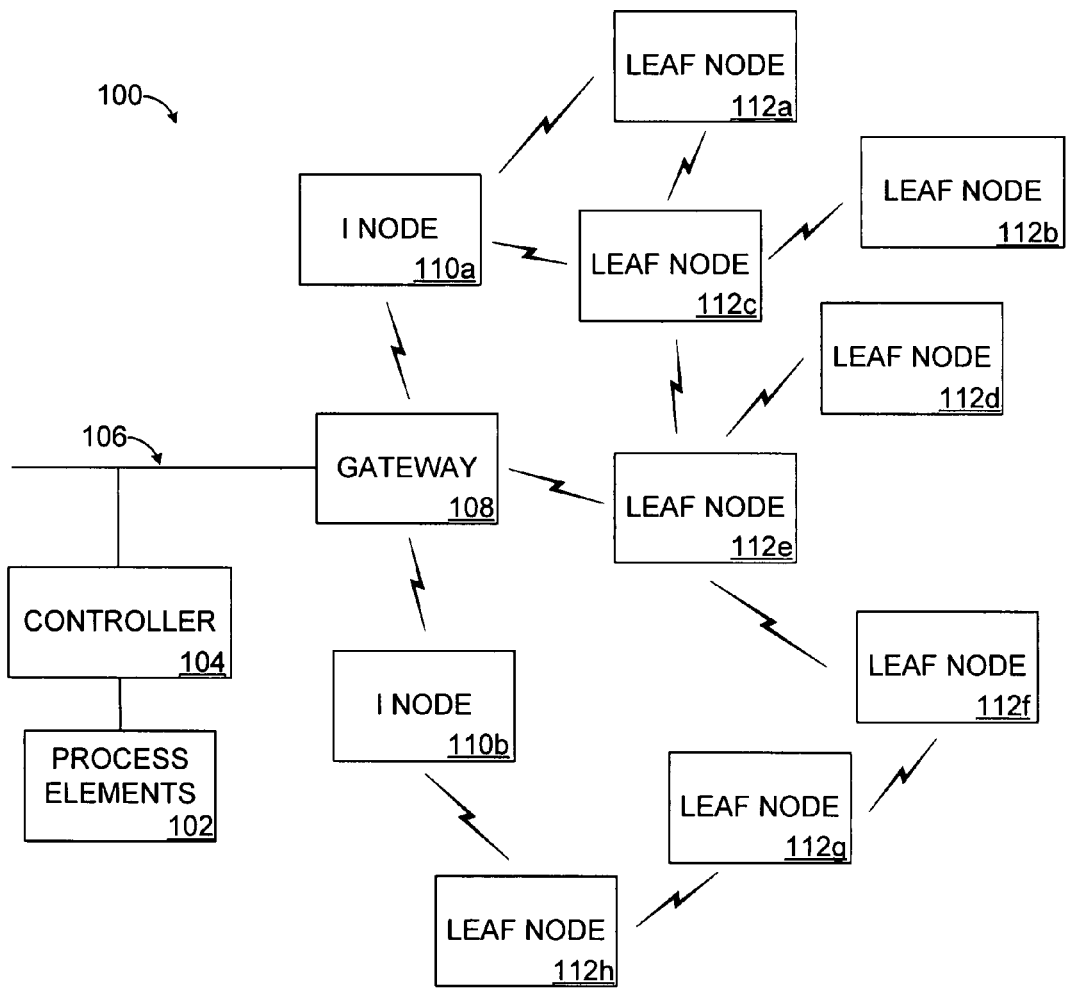
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102. The process elements 102 represent components in a process or production system that may perform any of a wide variety of functions. For example, the process elements 102 could represent valves, pumps, or any other or additional industrial equipment in a processing environment. Each of the process elements 102 includes any suitable structure for performing one or more functions in a processing or production system.

A controller 104 is coupled to the process elements 102. The controller 104 controls the operation of one or more of the process elements 102. For example, the controller 104 could be capable of providing control signals to one or more of the process elements 102, thereby adjusting the operation of those process elements 102. The controller 104 could also receive information associated with the system 100, such as by receiving sensor measurements of a flow rate of material through a pipe. The controller 104 could use this data to control one or more of the process elements 102, such as by controlling a valve using the measured flow rate. The controller 104 includes any hardware, software, firmware, or combination thereof for controlling one or more process elements 102. The controller 104 could, for example, represent a computing device executing a MICROSOFT WINDOWS operating system.

A network 106 couples the controller 104 to other components in the process control system 100. The network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the process control system 100 also includes one or more wireless networks for communicating with portable sensors or other wireless devices in a processing environment. In this example, a wireless network is formed using a gateway 108, infrastructure nodes ("I nodes") 110a-110b, and leaf nodes 112a-112h.

The gateway 108 converts data between the protocol(s) used by the network 106 and the protocol(s) used by the nodes 110a-110b, 112a-112h. For example, the gateway 108 could convert Ethernet-formatted data (used by the network 106) into a wireless protocol format (such as the IEEE 802.11a, 802.11b, 802.11g, 802.11n, 802.15.3, 802.15.4, or 802.16 protocol format) used by the nodes 110a-110b, 112a-112h. The gateway 108 could also convert data received from one or more of the nodes 110a-110b, 112a-112h into Ethernet-formatted data for transmission over the network 106. The gateway 108 includes any suitable structure for facilitating communication between components or networks using different protocols.

The infrastructure nodes 110a-110b and the leaf nodes 112a-112h engage in wireless communications with the gateway 108. For example, at least some of the nodes 110a-110b, 112a-112h may receive or generate data for wireless transmission and communicate the data wirelessly for delivery to the gateway 108. Also, at least some of the nodes 110a-110b, 112a-112h may receive data transmitted from the gateway 108 and use the data and/or forward the data to another destination. In this way, the nodes 110a-110b, 112a-112h form a wireless network capable of providing wireless coverage to a specified area, such as in a large industrial complex.

In this example, the nodes 110a-110b, 112a-112h are divided into infrastructure nodes and leaf nodes. The infrastructure nodes 110a-110b represent line-powered devices, meaning these nodes receive operating power from an external source. As a result, these nodes 110a-110b are typically not limited in their operations by an internal power supply. On the other hand, the leaf nodes 112a-112h represent battery-powered devices, meaning these nodes receive operating power from internal batteries or other power supplies. Because of this, these nodes 112a-112h are often more limited in their operations in order to help preserve the operational life of their internal power supplies.

Figure 2:
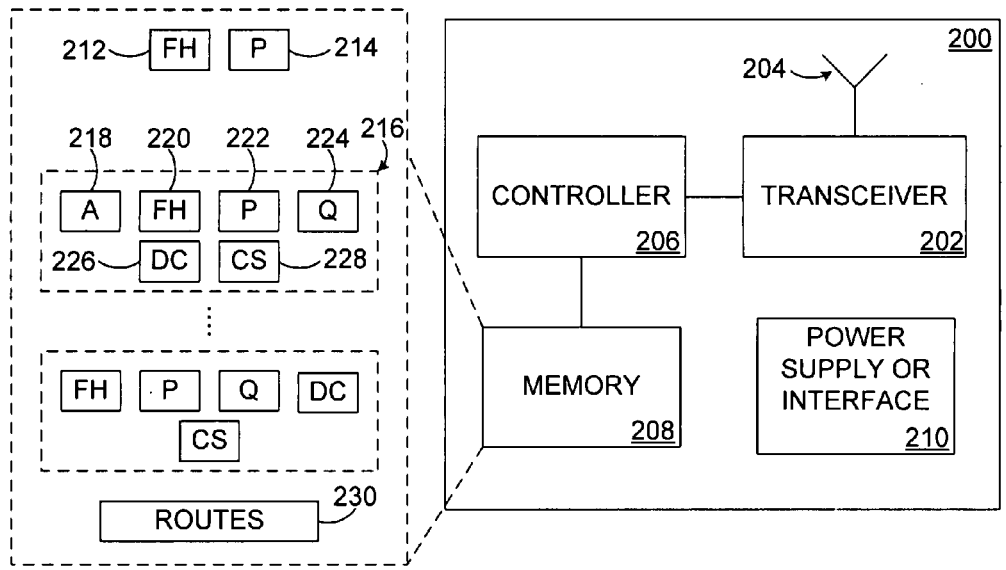
FIG. 2 illustrates an example node in a process control system according to one embodiment of this disclosure.

Each of the nodes 110a-110b, 112a-112h includes any suitable structure facilitating wireless communications to and from the gateway 108. One example embodiment of the nodes 110a-110b, 112a-112h is shown in FIG. 2, which is described below. Each of the nodes 110a-110b, 112a-112h could also include other functionality, such as functionality for generating or using data communicated over the wireless network. For example, the leaf nodes 112a-112h could represent sensors in an industrial facility that are used to measure various characteristics within the facility. These sensors could collect sensor readings and communicate the sensor readings to the controller 104 via the gateway 108. The leaf nodes 112a-112h could also represent actuators that can receive control signals from the controller 104 and adjust the operation of the industrial facility. In this way, the leaf nodes 112a-112h may include or operate in a similar manner as the process elements 102 that are physically connected to the controller 104.

In one aspect of operation, the gateway 108 and the nodes 110a-110b, 112a-112h communicate using a frequency-hopping spread-spectrum technique. In conventional frequency-hopping spread-spectrum systems, synchronization of the wireless transmitters and receivers often involves significant overhead and can result in increased power consumption. For example, synchronization of an entire conventional frequency-hopping spread-spectrum system may require a large number of messages to be exchanged, which consumes power in the transmitters and receivers. This can cause particular problems for battery-powered devices, such as leaf nodes 112a-112h. Moreover, synchronization of an entire system often results in a single frequency channel being used at any one time in the system.

To overcome these or other disadvantages, each of the nodes 110a-110b, 112a-112h in the system 100 can be synchronized locally with its neighboring nodes or the gateway 108. However, each of the nodes 110a-110b, 112a-112h does not necessarily have to be synchronized with all other nodes in the system 100 at all times. Rather, during normal operation, a particular node can operate using its own frequency-hopping pattern and phase. That particular node can also synchronize itself with a neighboring node in order to transmit data to the neighboring node. In this way, nodes may communicate locally with one another without the overhead necessary for system-wide synchronization. Moreover, different nodes in the system 100 can transmit data using different frequency channels at the same time, thereby increasing usage of the frequency channels and increasing the bandwidth available for communicating data.

In order to communicate with each other, the gateway 108 and the nodes 110a-110b, 112a-112h in the system 100 can implement various initialization and discovery procedures. These procedures allow each node 110a-110b, 112a-112h in the system 100 to discover the identity of its neighboring nodes and to identify certain information about its neighboring nodes, such as each neighboring node's frequency-hopping pattern and phase. These procedures also allow each node 110a-110b, 112a-112h in the system 100 to determine one or more paths to the gateway 108. In this way, each of the nodes 110a-110b, 112a-112h is able to obtain the information it needs to communicate within the wireless network. Various initialization and discovery procedures are described in more detail below.

Although FIG. 1 illustrates one example of a process control system 100, various changes may be made to FIG. 1. For example, the process control system 100 could include any number of process elements, controllers, networks, gateways, infrastructure nodes, and leaf nodes. Also, the functional division shown in FIG. 1 is for illustration only. Various components in FIG. 1 could be combined or omitted and additional components could be added according to particular needs. Further, while described as supporting a wireless network, the process control system 100 could support any number of wireless networks or sub-networks. Beyond that, the communication paths in FIG. 1 are for illustration only and can be changed depending on the implementation. As a particular example, while the leaf nodes 112a-112h in FIG. 1 are shown communicating directly with each other, the leaf nodes 112a-112h could only communicate with the infrastructure nodes 110a-110b. In addition, FIG. 1 illustrates one operational environment in which the use of frequency-hopping spread-spectrum communications and initialization and discovery procedures could be used. This functionality could be used in any suitable process control or non-process control system or environment.

FIG. 2 illustrates an example node 200 in a process control system according to one embodiment of this disclosure. The node 200 could, for example, represent an infrastructure node or a leaf node from the process control system 100 of FIG. 1. The embodiment of the node 200 shown in FIG. 2 is for illustration only. Other embodiments of the node 200 could be used without departing from the scope of this disclosure. Also, for ease of explanation, the node 200 in FIG. 2 is described as operating in the system 100 of FIG. 1. The node 200 could be used in any other capacity in any suitable device, system, or network.

As shown in FIG. 2, the node 200 includes a transceiver 202. The transceiver 202 facilitates wireless communications to and from the node 200 using frequency-hopping spread spectrum. For example, the transceiver 202 could receive a baseband or intermediate data signal and modulate the signal onto a carrier signal for transmission by an antenna 204. The transceiver 202 could also receive a carrier signal from the antenna 204 and down-convert the signal into a baseband or intermediate signal. The transceiver 202 includes any suitable structure for transmitting and/or receiving wireless signals. In some embodiments, the transceiver 202 represents a radio frequency (RF) transceiver, and the antenna 204 represents an RF antenna. The transceiver 202 could use any other suitable wireless signals to communicate. Also, the transceiver 202 could be replaced by a transmitter and a separate receiver, or the transceiver 202 could be replaced by a transmitter if the node 200 represents a "transmit-only" type of node.

A controller 206 is coupled to the transceiver 202. The controller 206 controls the overall operation of the node 200. For example, the controller 206 may receive or generate data to be transmitted externally, and the controller 206 could provide the data to the transceiver 202 for wireless transmission. The controller 206 could also receive data from the transceiver 202 that was transmitted to the node 200 and use the data. As a particular example, the controller 206 could receive or generate measurement data associated with an industrial process and provide the data to the transceiver 202 for transmission to the controller 104 (via the gateway 108). The controller 206 could also receive data from the controller 104 and adjust operation of one or more actuators in the process control system 100. The controller 206 could further receive and transmit data used to synchronize the nodes in the system 100, such as transmitting the frequency-hopping pattern and phase of the node 200 or receiving the frequency-hopping pattern and phase of another node. In addition, the controller 206 could use this information to synchronize the transceiver 202 for communications with other nodes in the system 100. The controller 206 includes any suitable hardware, software, firmware, or combination thereof for controlling operation of the node 200. As particular examples, the controller 206 could represent a processor, microprocessor, microcontroller, field programmable gate array (FPGA), or other processing or control device.

A memory 208 is coupled to the controller 206. The memory 208 stores any of a wide variety of information used, collected, or generated by the node 200. For example, as described in more detail below, the memory 208 could store various information used by the node 200 to synchronize and communicate with neighboring nodes in the process control system 100. The memory 208 includes any suitable volatile and/or non-volatile storage and retrieval device or devices.

In addition, the node 200 includes a power supply or interface 210. If the node 200 represents an infrastructure node 110a-110b, the power supply or interface 210 may represent a power converter, regulator, distributor, or other structure for receiving power from an external source and providing power to the components of the node 200. The power may be received from the external source in any suitable manner, such as over one or more wires or other physical connections. If the node 200 represents a leaf node 112a-112h, the power supply or interface 210 may represent an internal or locally connected power supply that provides power to the components of the node 200. In leaf nodes, the power supply or interface 210 could represent any suitable source of power, such as a battery, a solar cell, a fuel cell, or any other source of power.

In this example, the memory 208 is used to store various information facilitating wireless communications to and from the node 200. For example, the memory 208 could store the frequency-hopping pattern (FH) 212 and phase 214 of the node 200. The frequency-hopping pattern 212 identifies the order in which the node 200 uses various frequency channels during wireless transmissions. The frequency-hopping pattern 212 could, for example, represent a sequence of one thousand channel identifiers, each identifying one of fifteen channels. The phase 214 identifies the current location in the frequency-hopping pattern 212.

As described above, when operating in the process control system 100 or other system, the node 200 may use information collected from neighboring nodes to communicate locally with those neighboring nodes. Various data can be stored in the memory 208 to support these functions. For example, the memory 208 could include various sets 216 of data, where each set 216 is associated with a different neighboring node. In particular embodiments, each set 216 represents a collection of registers. For each neighboring node, a set 216 may identify the address (A) 218 of the neighboring node, the frequency-hopping pattern (FH) 220 used by the neighboring node, the phase (P) 222 of the neighboring node, and the quality (Q) 224 of the wireless link to the neighboring node.

A set 216 could also include additional information. For example, as described in more detail below, a neighboring node could represent a transmit-only node, meaning the neighboring node does not include a receiver for receiving data. As a result, it may not be possible for the neighboring node to synchronize itself to the node 200. In these embodiments, the node 200 includes additional data that it can use to synchronize itself to the transmissions made by the neighboring node. For instance, the set 216 could include the duty cycle (DC) 226 and the clock skew (CS) 228 of the neighboring node. The duty cycle 226 identifies the interval between transmissions from the neighboring node. The clock skew 228 identifies a difference between the clock used by the node 200 and the clock used by the neighboring node. Using this information, the node 200 can predict when the neighboring node transmits data and can prepare to receive the data transmitted by the neighboring node.

In addition, as described in more detail below, the node 200 may analyze received data from its neighboring nodes to identify one or more paths or routes to the gateway 108 or other destination. The node 200 may store one or more routes 230 in the memory 208. The routes 230 could include a primary route and a backup route to the gateway 108, all identified routes to the gateway 108, or any number of routes to one or more other destinations.

Although FIG. 2 illustrates one example of a node 200 in a process control system, various changes may be made to FIG. 2. For example, the memory 208 could store any other or additional information in any suitable arrangement. Also, various components in FIG. 2 could be combined or omitted or additional components could be added according to particular needs.

Figure 3:
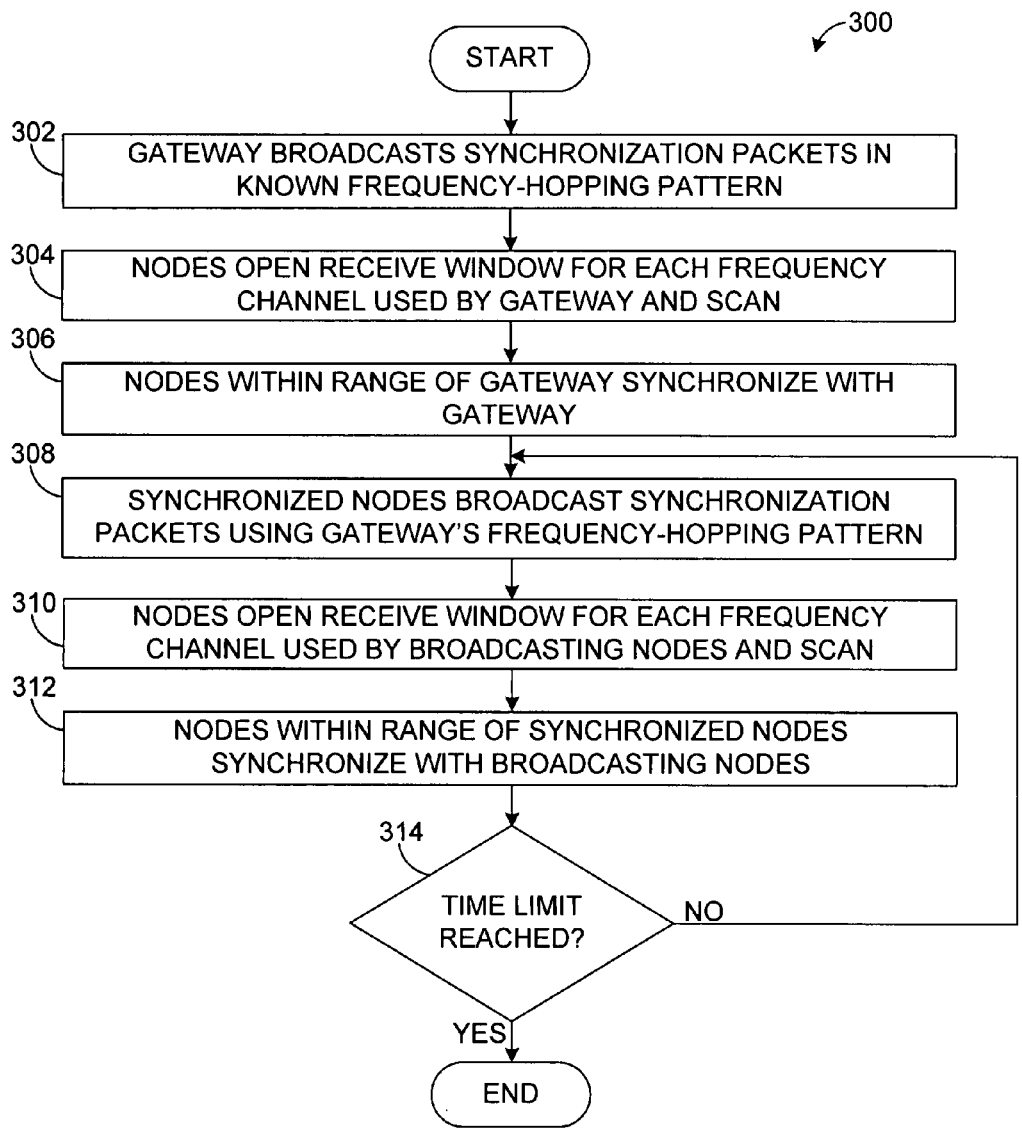
FIG. 3 illustrates an example method for wireless initial configuration according to one embodiment of this disclosure.

FIG. 3 illustrates an example method 300 for wireless initial configuration according to one embodiment of this disclosure. The method 300 could, for example, be used in the system 100 of FIG. 1 to synchronize all nodes in the system 100 to the frequency-hopping pattern of the gateway 108. This synchronization can facilitate other operations, such as the exchange of frequency-hopping information between neighboring nodes in the system 100. The embodiment of the method 300 shown in FIG. 3 is for illustration only. Other embodiments of the method 300 could be used without departing from the scope of this disclosure. Also, for ease of explanation, the method 300 is described with respect to the system 100 of FIG. 1. The method 300 could be used with any other suitable device or system.

A gateway begins broadcasting synchronization packets in a known frequency-hopping pattern at step 302. This could include, for example, the gateway 108 broadcasting small synchronization packets using a predefined frequency-hopping pattern. The gateway 108 could transmit a synchronization packet multiple times at each frequency channel in the frequency-hopping pattern.

Nodes open their receive windows for each frequency channel used by the gateway and scan each frequency channel for the synchronization packets at step 304. This may include, for example, the nodes 110a-110b, 112a-112h in the system 100 scanning the frequency channels and attempting to locate the synchronization packets from the gateway 108. During this step, the nodes 110a-110b, 112a-112h may use a very rapid hopping scan mode to locate the synchronization packets from the gateway 108. For example, the time taken by each node to scan all frequency channels could equal the time spent by the gateway 108 transmitting synchronization packets on one frequency channel.

Nodes within range of the gateway synchronize with the gateway at step 306. This could include, for example, the infrastructure nodes 110a-110b and the leaf node 112e in FIG. 1 synchronizing with the frequency-hopping pattern and phase of the gateway 108. By scanning all frequency channels during the time that the gateway 108 is broadcasting on one frequency channel, the nodes within range of the gateway 108 can identify the synchronization packets from the gateway 108 and synchronize with the gateway's frequency-hopping pattern.

At this point, the synchronized nodes broadcast synchronization packets using the gateway's frequency-hopping pattern at step 308. This could include, for example, the infrastructure nodes 110a-110b and the leaf node 112e in FIG. 1 broadcasting synchronization packets using the frequency-hopping pattern of the gateway 108 (to which they are synchronized). The remaining nodes in the system 100 open their receive windows and scan for the synchronization packets at step 310. Nodes within range of the broadcasting nodes synchronize with the broadcasting nodes (and thereby synchronize with the gateway) at step 312. For example, leaf nodes 112a and 112c could synchronize with infrastructure node 110a in FIG. 1, and leaf node 112h could synchronize with infrastructure node 110b in FIG. 1.

If a time limit or other condition has not been met at step 314, the process returns to step 308, where the synchronized nodes broadcast synchronization packets and other nodes in the system are synchronized. Otherwise, the time limit or other condition has been met, and the method 300 ends. Ideally, at that point, all of the nodes 110a-110b, 112a-112h in the system 100 are synchronized with the gateway 108, and additional operations can occur.

Figure 4:
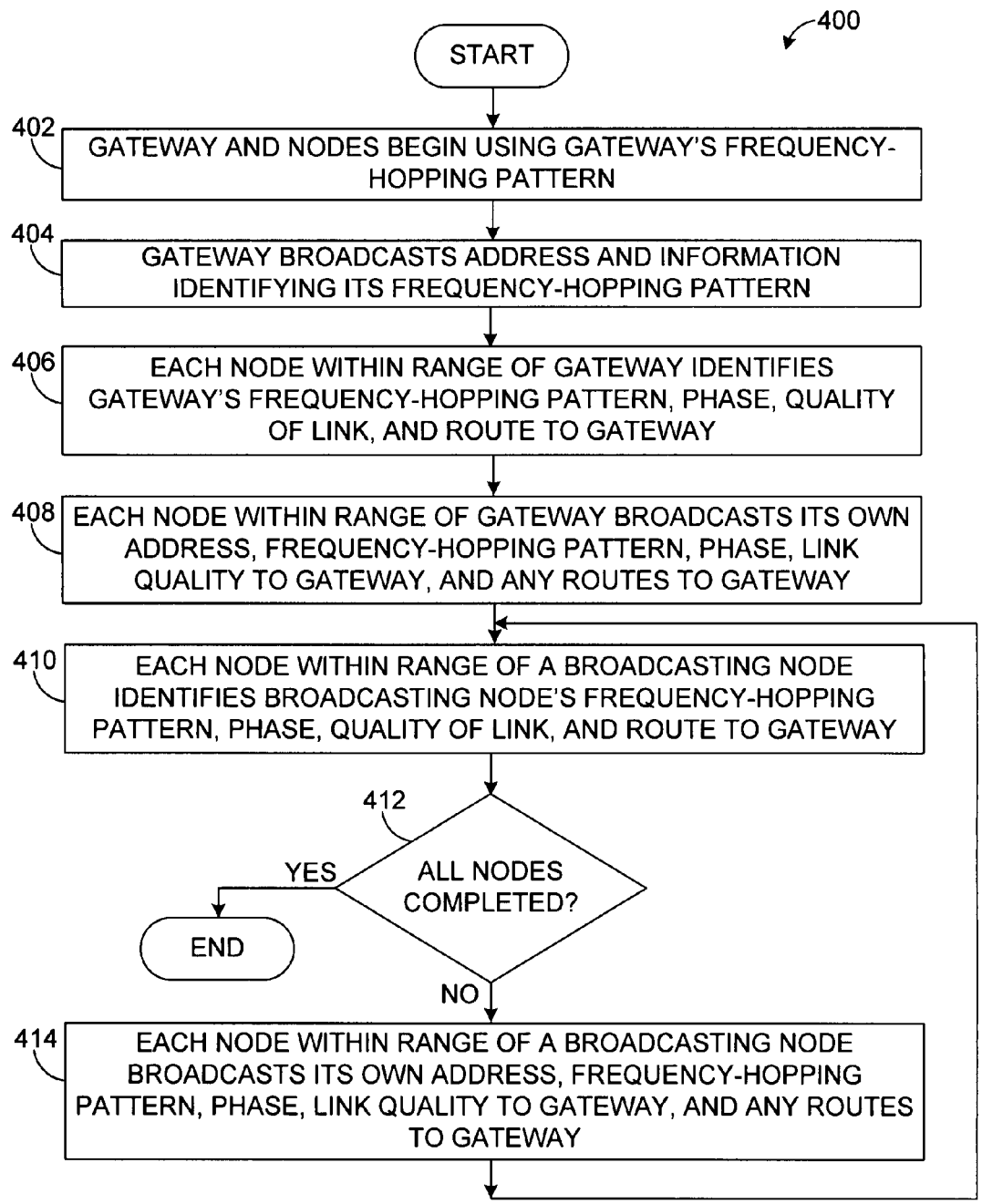
FIG. 4 illustrates an example method for wireless physical discovery according to one embodiment of this disclosure.

FIG. 4 illustrates an example method 400 for wireless physical discovery according to one embodiment of this disclosure. The method 400 could, for example, be used in the system 100 after the nodes in the system 100 have been synchronized with the gateway 108 (as shown in FIG. 3). This physical discovery process may allow nodes in the system 100 to discover the identity of any neighboring nodes. The embodiment of the method 400 shown in FIG. 4 is for illustration only. Other embodiments of the method 400 could be used without departing from the scope of this disclosure. Also, for ease of explanation, the method 400 is described with respect to the system 100 of FIG. 1. The method 400 could be used with any other suitable device or system.

The gateway and the nodes in a system begin using the gateway's frequency-hopping pattern at step 402. This could include, for example, the gateway 108 entering transmit mode and the nodes 110a-110b, 112a-112h entering receive mode. The nodes may use information collected during the method 300 to estimate the gateway's frequency-hopping pattern.

The gateway broadcasts its address and information associated with its frequency-hopping pattern at step 404. This could include, for example, the gateway 108 broadcasting its address and a seed value that can be used by the nodes to identify the gateway's specific frequency-hopping pattern. This may also include the gateway 108 entering receive mode after this information is broadcast.

Each node within range of the gateway identifies various information about the gateway at step 406. For example, each node within range of the gateway 108 may identify the gateway's frequency-hopping pattern and phase, as well as the quality of the wireless link to the gateway 108. Each node within range of the gateway 108 may also identify a route to the gateway 108, which in this case is a single direct path to the gateway 108. At this point, each node within range of the gateway 108 has the information required to synchronize with the gateway 108.

Each node within range of the gateway broadcasts its own information at step 408. This may include, for example, each node within range of the gateway 108 broadcasting its own address, its own frequency-hopping pattern and phase, and its link quality with the gateway 108. This may also include each node within range of the gateway 108 broadcasting any routes it has identified to the gateway 108. In particular embodiments, each broadcasting node may broadcast this information after performing Carrier Sense Multiple Access/Collision Avoidance (CSMA/CA) sensing, and each broadcasting node may enter receive mode after its broadcast.

Each node within range of a broadcasting node identifies various information associated with the broadcasting node at step 410. This may include, for example, each node within range of a broadcasting node identifying a broadcasting node's frequency-hopping pattern, phase, and link quality. This may also include identifying one or more routes to the gateway 108 (through the broadcasting nodes).

This process can then repeat itself until all nodes in the system have received information about their neighbors. If all nodes in the system have not received information about their neighbors at step 412, each node that was synchronized during step 410 broadcasts its own information at step 414. This could include, for example, each node broadcasting its own address, frequency-hopping pattern and phase, link quality to the gateway 108, and any routes it identified to the gateway 108. Again, each broadcasting node could broadcast after performing CSMA/CA sensing and then enter receive mode after its broadcast. The method 400 then returns to step 410, where any neighbors of the broadcasting nodes receive the data from the broadcasting nodes. Eventually, all nodes identify the relevant information about their neighbors, and the method 400 ends.

Figure 5:
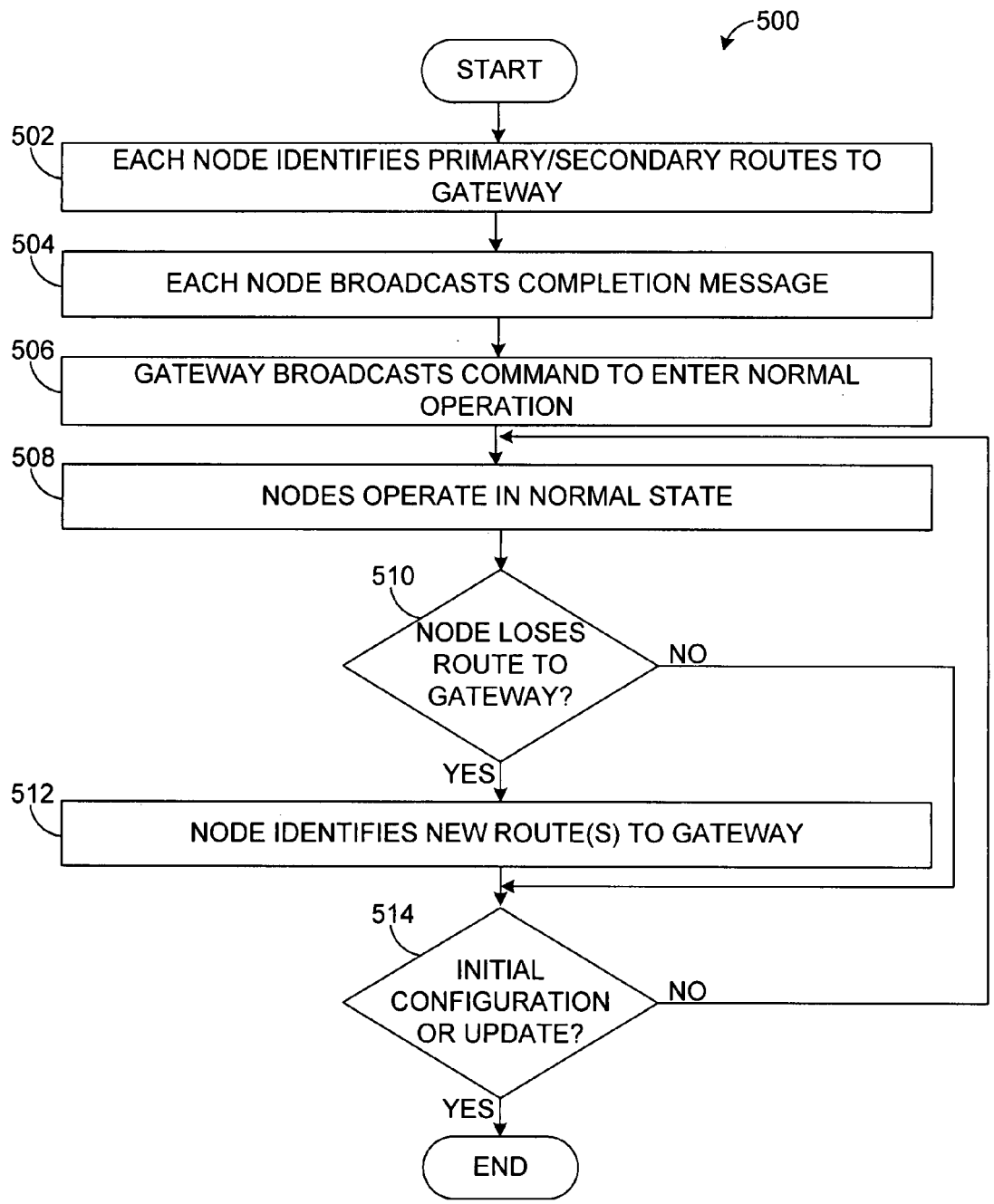
FIG. 5 illustrates an example method for wireless network discovery according to one embodiment of this disclosure.

FIG. 5 illustrates an example method 500 for wireless network discovery according to one embodiment of this disclosure. The method 500 could, for example, be used in the system 100 after the nodes in the system 100 have been synchronized with the gateway 108 (as shown in FIG. 3) and after the nodes have identified their neighbors (as shown in FIG. 4). This network discovery process may allow nodes in the system 100 to identify one or more routes to be used to communicate with the gateway 108. The embodiment of the method 500 shown in FIG. 5 is for illustration only. Other embodiments of the method 500 could be used without departing from the scope of this disclosure. Also, for ease of explanation, the method 500 is described with respect to the system 100 of FIG. 1. The method 500 could be used with any other suitable device or system.

Each node identifies a primary route and a secondary route to the gateway at step 502. During the method 400, each node may have identified multiple routes to the gateway 108. For a specific node, each of its neighboring nodes may have broadcast information identifying that neighboring node's identified routes to the gateway 108. The routes from all neighboring nodes may represent a collection of routes from which the primary and secondary routes can be selected. Any suitable criteria can be used for selecting the primary and secondary routes, such as selecting the optimal routes in terms of minimum number of hops, best link quality, minimum number of common intermediate nodes (minimum amount of overlap between routes), or a combination of these. The identified primary and secondary routes (and possibly all routes) can be stored, such as in memory 208. Each node then broadcasts a completion message at step 504.

After all nodes have broadcast completion messages, the gateway broadcasts a command for the nodes to enter a normal mode of operation at step 506, and the nodes function in their normal mode of operation at step 508. In the normal mode of operation, each node follows its own frequency-hopping pattern and its own individual clock. In this mode, the nodes may become unsynchronized with each other, such as due to clock drift caused by crystal imperfections and variations in environment (such as temperature). When wireless communications occur, a node may use the information collected from a neighboring node to temporarily synchronize with the neighboring node. This enables wireless communications in a frequency-hopping system while reducing the overhead necessary to maintain synchronization of the entire system 100. It also enables different nodes to use different frequency channels at the same time, thereby increasing the bandwidth available for wireless communications.

If a node loses a route to the gateway during normal operation at step 510, the node identifies one or more new routes to the gateway at step 512. This could include, for example, performing the same functions as performed during step 502 to identify other routes to the gateway 108. If no initial configuration or update of the system is needed at step 514, the process returns to step 508, and the nodes continue operating in normal mode. Otherwise, initial configuration or updating of the system is needed, and the method 500 ends. At this point, the method 300 in FIG. 3 can be performed for initial configuration, or a method can be performed for updating the network.

Figure 6:
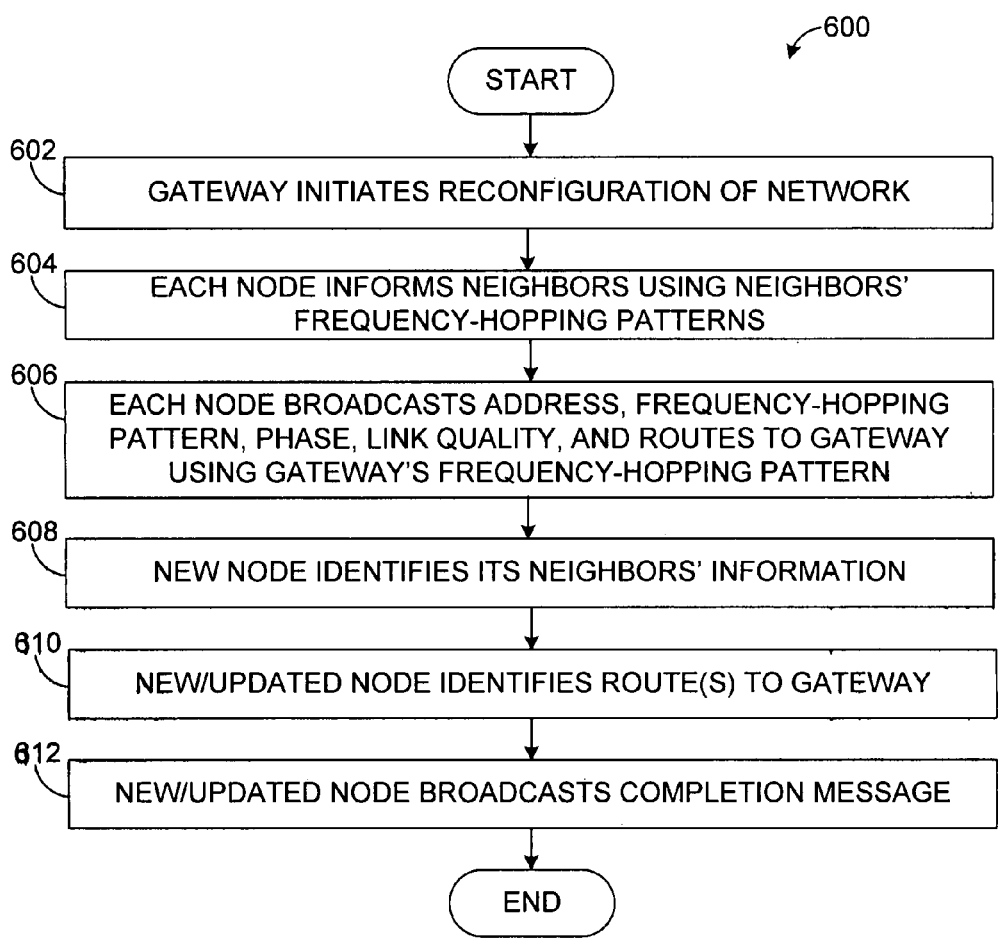
FIG. 6 illustrates an example method for wireless network updating according to one embodiment of this disclosure.

FIG. 6 illustrates an example method 600 for wireless network updating according to one embodiment of this disclosure. The method 600 could, for example, be used when a new node is added to the system 100 or an existing node loses a route to the gateway 108. The embodiment of the method 600 shown in FIG. 6 is for illustration only. Other embodiments of the method 600 could be used without departing from the scope of this disclosure. Also, for ease of explanation, the method 600 is described with respect to the system 100 of FIG. 1. The method 600 could be used with any other suitable device or system.

The gateway initiates reconfiguration of the network at step 602. This could include, for example, the gateway broadcasting a message indicating that reconfiguration of the wireless network is occurring. The reconfiguration of the network could be initiated in any suitable manner, such as manually by a user through a user device (like a computing device or a handheld personal digital assistant). Each node in the system then informs its neighbors of the reconfiguration at step 604. This could include, for example, each node using each neighboring node's frequency-hopping pattern and phase to communicate with that neighboring node.

Each node then broadcasts information associated with that node using the gateway's frequency-hopping pattern at step 606. This could include, for example, each node broadcasting its address, frequency-hopping pattern, phase, link quality, and paths to the gateway 108. The gateway's frequency-hopping pattern used during this step may be the same frequency-hopping pattern identified during initial configuration. Also, during this step, CSMA/CA sensing can be used to avoid simultaneous transmissions. During this step, a new node or a node being updated identifies its neighbors and information associated with its neighbors (such as frequency-hopping pattern and phase) at step 608. The new node or the node being updated identifies one or more routes to the gateway at step 610, and the node broadcasts a completion message at step 612. At this point, the new node or the node being updated possesses information for synchronizing with its neighboring nodes, allowing the new or updated node to communicate.

Figure 7:
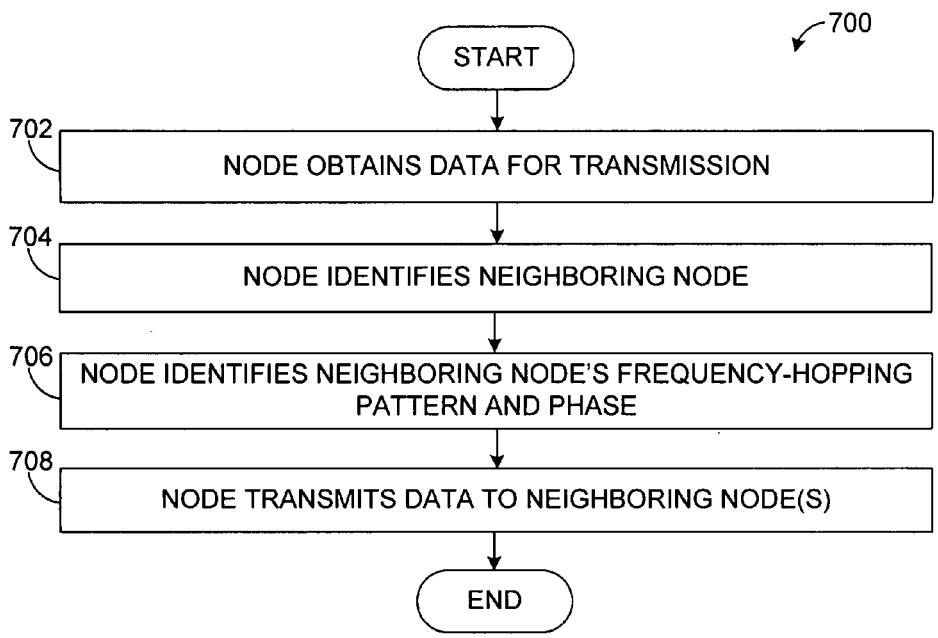
FIG. 7 illustrates an example method for transmission in a wireless network according to one embodiment of this disclosure.

FIG. 7 illustrates an example method 700 for transmission in a wireless network according to one embodiment of this disclosure. The method 700 could, for example, be used by one node in the system 100 to communicate with a neighboring node. The embodiment of the method 700 shown in FIG. 7 is for illustration only. Other embodiments of the method 700 could be used without departing from the scope of this disclosure. Also, for ease of explanation, the method 700 is described with respect to the system 100 of FIG. 1. The method 700 could be used with any other suitable device or system.

A node obtains data for transmission at step 702. This could include, for example, a node receiving or generating data associated with a sensor measurement. This could also include a node receiving a command for transmission to an actuator in the system 100. The node identifies a neighboring node at step 704. This could include, for example, the node identifying the route to the gateway 108 (for data being sent to the gateway 108) or identifying the route to a neighboring node (for data being sent from the gateway 108). The node identifies the neighboring node's frequency-hopping pattern and phase at step 706. This could include, for example, using information obtained from the neighboring node during prior transmissions from the neighboring node (such as during physical discovery). This information is used to transmit the data to the neighboring node at step 710. In this way, the transmitting node is able to synchronize itself to at least one neighboring node for the transmission. The nodes need not stay synchronized throughout their operation.

Figure 8:
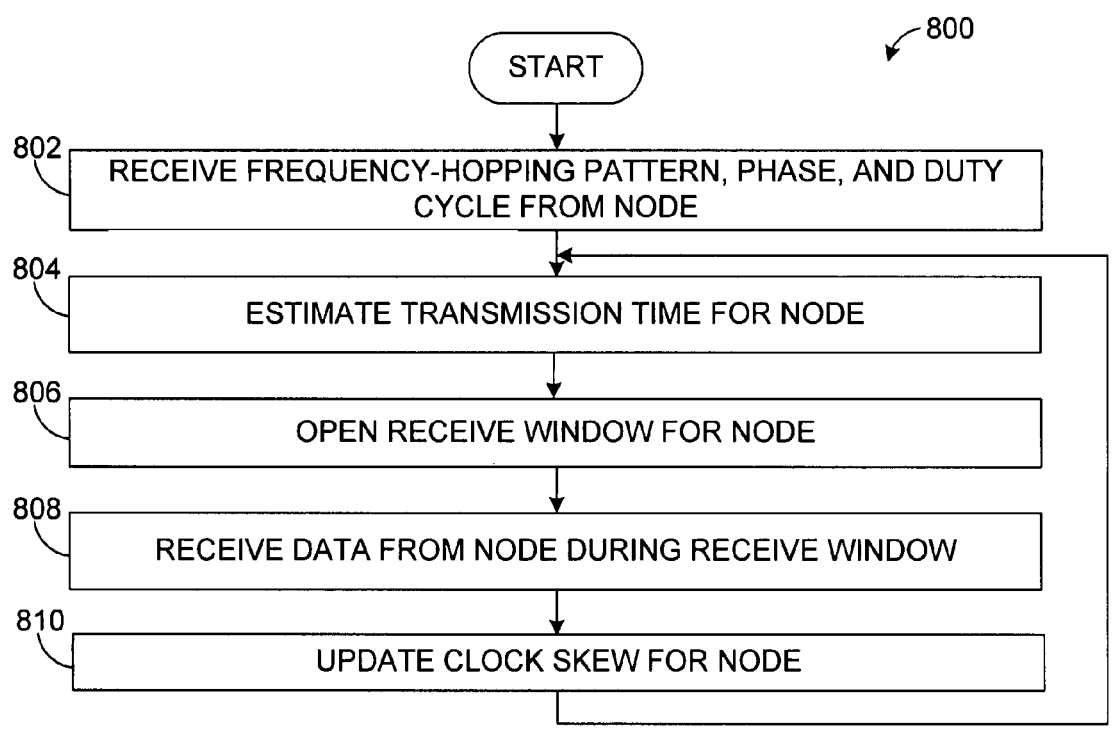
FIG. 8 illustrates an example method for reception in a wireless network according to one embodiment of this disclosure.

FIG. 8 illustrates an example method 800 for reception in a wireless network according to one embodiment of this disclosure. The method 800 could, for example, be used by an infrastructure node 110a-110b that is attempting to receive a transmission from a transmit-only leaf node. The embodiment of the method 800 shown in FIG. 8 is for illustration only. Other embodiments of the method 800 could be used without departing from the scope of this disclosure. Also, for ease of explanation, the method 800 is described with respect to the system 100 of FIG. 1. The method 800 could be used with any other suitable device or system.

As noted above, some leaf nodes in the system 100 may represent transmit-only nodes. A transmit-only node cannot receive information from its neighbors in order to synchronize with the frequency-hopping patterns and phases of its neighbors. Instead, one or more of its neighbors can estimate the likely time of transmission from the transmit-only node and can prepare itself for reception at that time. In particular embodiments, the method 800 is used only by the infrastructure nodes 110a-110b and not by the leaf nodes 112a-112h (to conserve power at the leaf nodes 112a-112h).

A node receives the frequency-hopping pattern, phase, and duty cycle of a neighboring transmit-only node at step 802. The duty cycle represents the expected amount of time between operations at the neighboring transmit-only node, meaning it defines the expected amount of time between transmissions. If the frequency-hopping pattern used by the neighboring transmit-only node is known ahead of time, receipt of the frequency-hopping pattern could be omitted in this step.

The receiving node estimates the next transmission time of the neighboring transmit-only node at step 804. This could include, for example, identifying the current time and summing the current time with the neighboring transmit-only node's duty cycle.

The receiving node opens a receive window for the neighboring transmit-only node at step 806. The receive window could be centered at the estimated transmission time determined at step 804. During the first iteration of this step, the receive window could be larger. This may be done, for example, to ensure that the first transmission from the transmit-only node is captured, even though the amount of clock skew of the transmit-only node is unknown. The receiving node receives a data transmission from the neighboring transmit-only node at step 808. For example, the neighboring transmit-only node could transmit the same data on multiple frequency channels.

The receiving node updates the clock skew for the neighboring transmit-only node at step 810. This could include, for example, determining a difference between the calculated arrival time of the transmission and the actual arrival time of the transmission. The difference can be treated as the clock skew for the neighboring transmit-only node, and the clock skew can be stored (such as in the set 216 of data for that neighboring transmit-only node).

The process then returns to step 804 to estimate the next transmission time for the neighboring transmit-only node at step 804. During this iteration and subsequent iterations of this process, the receive window opened at step 806 could be smaller since the receiving node has a more accurate estimate of the transmit-only node's clock skew. However, because clock skew can be affected by factors such as temperature, the receive window may remain large enough to capture transmissions from the transmit-only node under differing conditions.

Although not shown, the duty cycle of the neighboring transmit-only node need not remain constant. The neighboring transmit-only node could dynamically change its duty cycle and then inform the receiving node of this change during a subsequent communication. For example, the transmit-only node could inform the receiving node of its new duty cycle or the absolute time of its next transmission. Moreover, if the neighboring transmit-only node's duty cycle is long, the clock skew between the nodes could become too large, making it difficult for the receiving node to accurately predict the transmission time of the transmit-only node. In some embodiments, the neighboring transmit-only node could transmit a short clock synchronization message having a period shorter than the duty cycle. This allows the receiving node to more accurately predict the arrival time of the data transmission from the transmit-only node.

In addition, the method 800 has been described as being performed by an infrastructure node 110a-110b for a transmit-only leaf node. However, the same method 800 could be used for a transceiver leaf node (a leaf node capable of transmission and reception). By implementing the method 800 on the line-powered infrastructure nodes 110a-110b, the leaf nodes 112a-112h need not perform various synchronization functions in order to successfully communicate data to the infrastructure nodes 110a-110b. This may reduce the power consumption of the leaf nodes 112a-112h and help to increase the life of the power supplies in the leaf nodes 112a-112h.

Although FIGS. 3 through 8 illustrate example functions that could be performed in a wireless network, various changes may be made to FIGS. 3 through 8. For example, while shown as a series of steps, various steps in each method could overlap, occur in parallel, or occur in a different order. Also, the functions illustrated in these figures could be implemented in any other suitable manner. In addition, nodes need not be limited to a single transmission of information during physical discovery. Each node could make multiple broadcasts, such as one broadcast of its own information and other broadcast(s) of its neighbors' information.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. An apparatus comprising:
a transceiver configured to communicate with a first node and a second node in a wireless network, the second node comprising a transmit-only node;
a memory configured to store information identifying a first frequency-hopping pattern of the first node and a second frequency-hopping pattern of the second node; and
a controller configured to synchronize the transceiver with the first node using the first frequency-hopping pattern;
the controller also configured to estimate a transmission time of the second node and to synchronize the transceiver with the second frequency-hopping pattern so the transceiver receives a transmission from the second node at or around the estimated transmission time;
the transceiver also configured to receive the information identifying the first frequency-hopping pattern using a gateway frequency-hopping pattern of a gateway.

2. The apparatus of claim 1, wherein the transceiver is configured to receive the information identifying the first frequency-hopping pattern from the first node.

3. The apparatus of claim 2, wherein the transceiver is configured to transmit information identifying a third frequency-hopping pattern of the apparatus to the first node.

4. The apparatus of claim 3, wherein the transceiver is configured to transmit the information identifying the third frequency-hopping pattern using the gateway frequency-hopping pattern.

5. The apparatus of claim 1, wherein:
the transceiver is configured to receive one or more synchronization messages from the gateway using the gateway frequency-hopping pattern; and
the transceiver is configured to transmit one or more synchronization messages to the first node using the gateway frequency-hopping pattern.

6. The apparatus of claim 1, wherein:
the controller is configured to identify one or more routes through the wireless network to the gateway; and
the transceiver is configured to transmit information identifying the one or more routes to the first node.

7. The apparatus of claim 1, wherein the apparatus, the first node, and the second node form part of a process control system, the process control system configured to control an industrial process.

8. A system comprising:
a gateway configured to facilitate communication between a wired network and a wireless network;
a plurality of first nodes in the wireless network, each first node configured to broadcast information identifying a frequency-hopping pattern of that first node using a frequency-hopping pattern of the gateway and to receive information identifying a frequency-hopping pattern of at least one other first node using the frequency-hopping pattern of the gateway, each first node also configured to communicate with the at least one other first node using the frequency-hopping pattern of the at least one other first node; and
a second node comprising a transmit-only node in the wireless network, wherein one or more of the first nodes are configured to estimate a transmission time of the second node, synchronize to a frequency-hopping pattern of the second node, and receive a transmission from the second node at or around the estimated transmission time.

9. The system of claim 8, wherein each first node comprises:
a transceiver configured to communicate with other first nodes;
a memory configured to store information associated with the frequency-hopping patterns of the other first nodes; and
a controller configured to synchronize the transceiver with the other first nodes using the frequency-hopping patterns of the other first nodes.

10. The system of claim 8, wherein:
each of the first nodes is configured to receive one or more synchronization messages from the gateway using the frequency-hopping pattern of the gateway; and
each of the first nodes is configured to transmit one or more synchronization messages to other first nodes using the frequency-hopping pattern of the gateway.

11. The system of claim 8, wherein:
each of the first nodes is configured to identify one or more routes through the wireless network to the gateway; and
each of the first nodes is configured to transmit information identifying the one or more routes to other first nodes.

12. The system of claim 8, wherein:
one or more of the plurality of first nodes are configured to estimate the transmission time of the second node using a duty cycle and a clock skew associated with the second node; and
the one or more of the plurality of first nodes are configured to update the clock skew after one or more transmissions by the second node.

13. A method comprising:
scanning a plurality of frequency channels for messages from a gateway at a first node in a wireless network;
synchronizing the first node with a first frequency-hopping pattern of the gateway using the messages;
transmitting information identifying a second frequency-hopping pattern of the first node to a second node in the wireless network using the first frequency-hopping pattern;
receiving information identifying a third frequency-hopping pattern of the second node at the first node using the first frequency-hopping pattern;
operating the first node using the second frequency-hopping pattern;
synchronizing the first node with the second node for wireless communication using the third frequency-hopping pattern;
estimating a transmission time of a third node, the third node comprising a transmit-only node;
synchronizing the first node with a fourth frequency-hopping pattern of the third node; and
receiving at the first node a transmission from the third node at or around the estimated transmission time.

14. The method of claim 13, wherein:

the gateway transmits multiple messages for a specified time period on each of the frequency channels; and scanning the plurality of frequency channels comprises scanning all frequency channels during each specified time period.

15. The method of claim 13, further comprising:

identifying one or more routes from the first node to the gateway; and transmitting information identifying the one or more routes to the second node.

16. A method comprising:

scanning a plurality of frequency channels for messages from a gateway at a first node in a wireless network;

synchronizing the first node with a first frequency-hopping pattern of the gateway using the messages;

transmitting information identifying a second frequency-hopping pattern of the first node to a second node in the wireless network using the first frequency-hopping pattern;

receiving information identifying a third frequency-hopping pattern of the second node at the first node using the first frequency-hopping pattern;

operating the first node using the second frequency-hopping pattern;

synchronizing the first node with the second node for wireless communication using the third frequency-hopping pattern;

identifying two or more routes from the first node to the gateway; and transmitting information identifying the one or more routes to the second node;

wherein identifying the two or more routes comprises selecting at least two routes from a set of routes, the at least two routes selected based on one or more of: a number of hops from the first node to the gateway, a quality of wireless links from the first node to the gateway, and a number of common intermediate nodes of the at least two routes.

17. A method comprising:

receiving, at a wireless node, information identifying a frequency-hopping pattern of a transmit-only node in a wireless network using a gateway frequency-hopping pattern of a gateway in the wireless network;

estimating a first transmission time of the transmit-only node;

synchronizing the wireless node with the transmit-only node using the frequency-hopping pattern;

receiving at the wireless node a first transmission from the transmit-only node at or around the estimated transmission time; and estimating a second transmission time of the transmit-only node based on a clock synchronization message transmitted from the transmit-only node.

18. The method of claim 17, wherein:

estimating the transmission time of the transmit-only node comprises estimating the transmission time using a duty cycle and a clock skew associated with the transmit-only node; and the method further comprises updating the clock skew after one or more transmissions by the transmit-only node.

19. The apparatus of claim 1, wherein:

the controller is configured to estimate the transmission time of the second node using a duty cycle and a clock skew associated with the second node; and the controller is further configured to update the clock skew after one or more transmissions by the second node.

20. The method of claim 13, wherein:

estimating the transmission time of the third node comprises estimate the transmission time of the third node using a duty cycle and a clock skew associated with the third node; and the method further comprises updating the clock skew after one or more transmissions by the third node.

21. The method of claim 16, further comprising:

estimating a transmission time of a third node, the third node comprising a transmit-only node;

synchronizing the first node with a fourth frequency-hopping pattern of the third node; and receiving at the first node a transmission from the third node at or around the estimated transmission time.

* * * * *